(12) United States Patent
Hyuugaji

(10) Patent No.: US 8,040,698 B2
(45) Date of Patent: Oct. 18, 2011

(54) FLYBACK SWITCHING POWER APPARATUS WITH SYNCHRONOUS RECTIFICATION AND LOAD DETECTION

(75) Inventor: Takumi Hyuugaji, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 418 days.

(21) Appl. No.: 12/400,128

(22) Filed: Mar. 9, 2009

(65) Prior Publication Data

US 2009/0279326 A1 Nov. 12, 2009

(30) Foreign Application Priority Data

May 12, 2008 (JP) .................. 2008-124219

(51) Int. Cl.
*H02M 3/335* (2006.01)
(52) U.S. Cl. .................................. 363/21.14
(58) Field of Classification Search ............... 363/21.14, 363/89, 127
See application file for complete search history.

(56) References Cited

U.S. PATENT DOCUMENTS

| | | | | |
|---|---|---|---|---|
| 5,946,207 | A * | 8/1999 | Schoofs | 363/127 |
| 6,995,991 | B1 * | 2/2006 | Yang et al. | 363/21.14 |
| 7,688,602 | B2 * | 3/2010 | Hu | 363/21.14 |
| 2007/0103946 | A1 * | 5/2007 | Kyono | 363/21.14 |
| 2009/0109711 | A1 * | 4/2009 | Hsu | 363/21.14 |
| 2009/0284995 | A1 * | 11/2009 | Sato | 363/21.14 |
| 2009/0316441 | A1 * | 12/2009 | Hu | 363/21.06 |
| 2010/0027298 | A1 * | 2/2010 | Cohen | 363/21.14 |
| 2010/0157630 | A1 * | 6/2010 | Polivka et al. | 363/21.16 |
| 2010/0182806 | A1 * | 7/2010 | Garrity et al. | 363/21.14 |

FOREIGN PATENT DOCUMENTS

JP 10-074936 A 3/1998

* cited by examiner

*Primary Examiner* — Jeffrey Sterrett
(74) *Attorney, Agent, or Firm* — Holtz, Holtz, Goodman & Chick, P.C.

(57) ABSTRACT

Disclosed a switching power source apparatus including: a transformer including a primary winding and a secondary winding; a switching element to intermittently apply a voltage to the primary winding by an on-off operation; and a synchronous rectifying element to rectify a current in the secondary winding, wherein the switching power source apparatus is a flyback system switching power source apparatus to receive input of electric power from a primary winding side to perform voltage output to a secondary wiring side, and the switching power source apparatus further comprises a load detection circuit to compare an output voltage to be output onto the secondary winding side with a voltage at a node between the synchronous rectifying element and the transformer by adding predetermined weighting to the voltages to be compared so as to generate a signal indicating a magnitude of an output load.

6 Claims, 6 Drawing Sheets

FIG.2
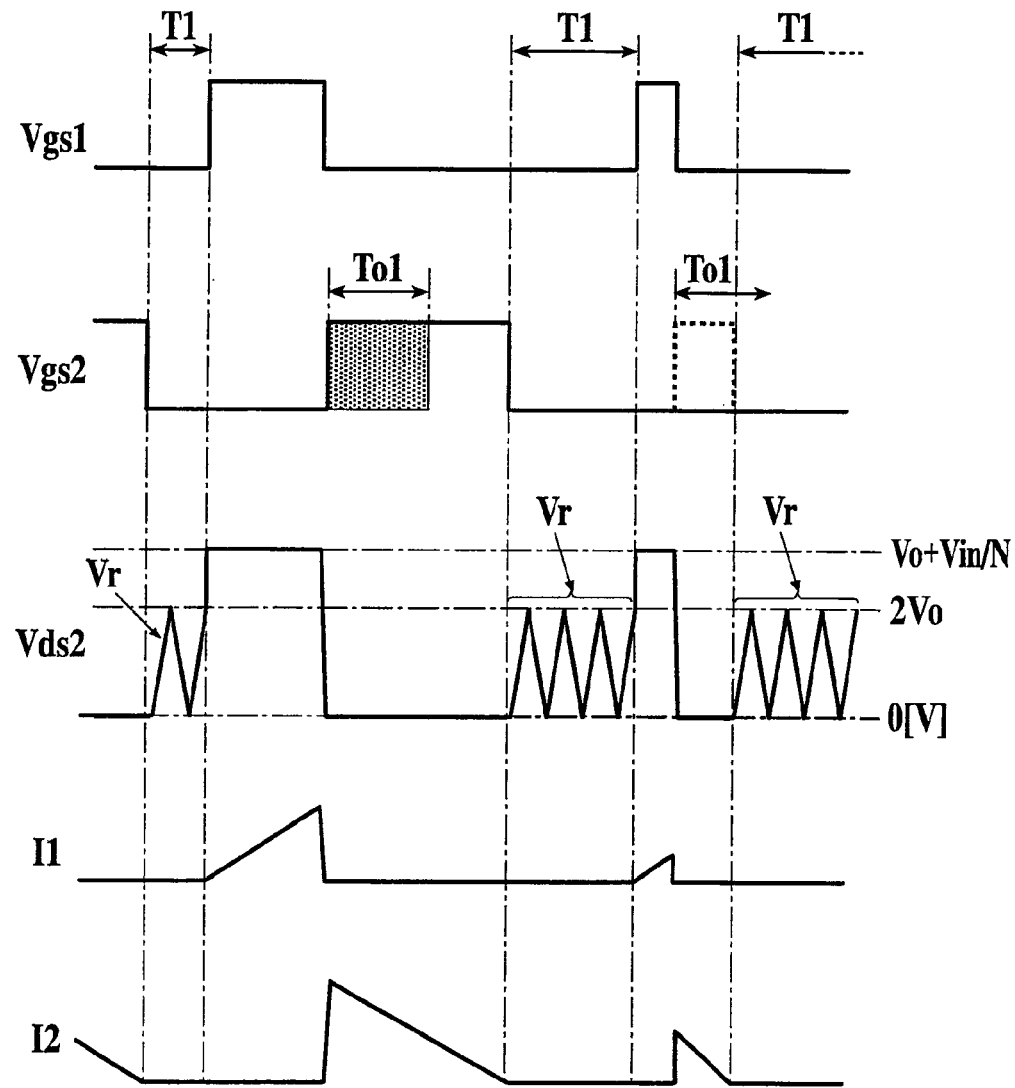
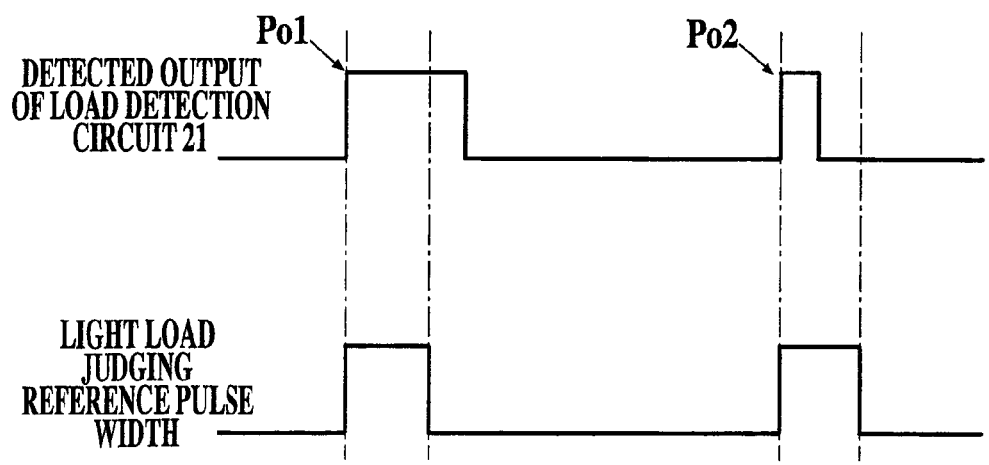

FLYBACK SWITCHING POWER APPARATUS WITH SYNCHRONOUS RECTIFICATION AND LOAD DETECTION

BACKGROUND OF THE INVENTION

1. Field of the Invention

The present invention relates to a flyback system switching power source apparatus including a synchronous rectifying element.

2. Description of Related Art

As shown in FIG. 5, there is a flyback system switching power source apparatus 50 equipped with a synchronous rectifying element SW52 on the secondary side of a transformer T51. In such a power source apparatus 50, if the synchronous rectifying element SW52 on the secondary side is turned on in an on-period of a switching element SW51 on the primary side of the transformer T51, then the output terminals of the power source apparatus 50 are short-circuited through the secondary winding N52 of the transformer T51 and the synchronous rectifying element SW52. Accordingly, it is needed to control the synchronous rectifying element SW52 lest the switching element SW51 on the primary side and the synchronous rectifying element SW52 should be simultaneously turned on. Moreover, there is also the situation such that it is impossible to supply the control signals to be used in a primary side control circuit 51 directly to a secondary side control circuit 52 in order to insulate the primary side of the transformer T51 from the secondary side thereof. As a conventional control method of a synchronous rectifying element SW52, there is, for example, the method of detecting the polarity of the current flowing on the secondary side by a current transformer to switch the turning on and off of the synchronous rectifying element SW52 on the basis of the detected current polarity. Moreover, the following method was also proposed (see, for example, Japanese Patent Application Laid-Open Publication No. Hei 10-74936). The method inserted an inductor in series with the synchronous rectifying element, detected the polarity of the current flowing on the secondary side based on the voltage between both the ends of the synchronous rectifying element and the inductor, and turned off the synchronous rectifying element when the characteristic of a forward direction current was detected and turned on the synchronous rectifying element when the characteristic of a reverse direction current was detected.

The inventors of the present invention examined the possibility of realizing the detection of the off timing of the synchronous rectifying element SW52 in the flyback system switching power source apparatus 50 without adding any parts such as the current transformer and the inductor.

As the result of the examination, the method of measuring the drain-to-source voltage Vds52 of the synchronous rectifying element SW52 to detect a state Q1 in which the voltage Vds52 exceeded a predetermined threshold value Vth, as shown in FIG. 6 (Vds52), as the off timing was considered as the detection method of the off timing of the synchronous rectifying element SW52. Since a secondary side current I2 flowing through the synchronous rectifying element SW52 gradually decreased in an on-period of the synchronous rectifying element SW52, it was possible to detect the state Q1 in which the secondary side current I2 was less than the predetermined value as the off timing by detecting a voltage drop caused by the on-resistance of the synchronous rectifying element SW52.

On the other hand, in the case of adopting the detection method of the off timing mentioned above, there was the following case: ringing was generated in the drain voltage Vds52 of the synchronous rectifying element SW52 at the moment of the turning-on of the switching element SW51 on the primary side as shown in FIG. 6 (I2 and Vds52), and the drain voltage Vds temporarily exceeded the threshold voltage Vth owing to the ringing as shown at a time point Q2 in FIG. 6 (Vds52). Consequently, if any efforts were not made, the problem in which the synchronous rectifying element SW52 was erroneously turned off at the time point Q2 at which the drain voltage Vds exceeded the threshold voltage Vth owing to the ringing, after the synchronous rectifying element SW52 had been turned on was caused.

Generally, in order to settle such a problem, it is conceivable to set a minimum on-time To1 during which the synchronous rectifying element SW52 is forcibly being turned on in a period of from the timing at which the synchronous rectifying element SW52 has been turned on to the time when the ringing disappears as shown in a hatched part of FIG. 6 (Vgs52).

However, if the minimum on-time To1 mentioned above was set, it was found that the following disadvantageous case was sometimes caused. That is, as shown in a state Q3 in FIG. 6 (I2), if the output load of the switching power source apparatus 50 became light and the secondary side current I2 became less than a zero current in a period of the minimum on-time To1, then notwithstanding the drain voltage Vds52 of the synchronous rectifying element SW52 exceeded the threshold voltage Vth not by the influence of ringing but in a reflection of the secondary side current I2 at a time point Q1a in FIG. 6 (Vds52), the synchronous rectifying element SW52 was not turned off until the time point Q1b at which the minimum on-time To1 had elapsed. Consequently, a reverse flow was caused in the secondary side current I2 as shown in the state Q3 of FIG. 6 (I2) in that period.

Consequently, it was considered that it was needed to avoid the disadvantage mentioned above by detecting the magnitude of the output load of the switching power source apparatus 50 on the secondary side of the transformer T51.

Moreover, it was also considered that if it was able to surely judge the magnitude of the output load of the switching power source apparatus 50 on the secondary side of the transformer T51, other effective processing, such as changing the detection method of the on-off timing of the synchronous rectifying element SW52, was also able to be realized.

Although the magnitude of the output load can be judged by providing a current detecting resistance into the current pathway of the secondary side current I2 to measure the voltage between both the ends of the resistance, the method has the following problem. That is, if the resistance value of the current detecting resistance is made to be small, then accurate detection becomes hard, and if the resistance value is made to be large, then the loss by the resistance becomes large.

SUMMARY OF THE INVENTION

The present invention is directed to provide a flyback system switching power source apparatus capable of performing the judgment of the magnitude of an output load on the secondary side of the transformer of the apparatus without adding any complex circuit configurations and causing any large loss.

In order to achieve the above object, a switching power source apparatus of the present invention includes: a transformer including a primary winding and a secondary winding; a switching element to intermittently apply a voltage to the primary winding by an on-off operation; and a synchronous rectifying element to rectify a current in the secondary winding, wherein the switching power source apparatus is a flyback system switching power source apparatus to receive input of electric power from a primary winding side to perform voltage output to a secondary wiring side, and the switching power source apparatus further comprises a load detection circuit to compare an output voltage to be output onto the secondary winding side with a voltage at a node between the synchronous rectifying element and the transformer by adding predetermined weighting to the voltages to be compared so as to generate a signal indicating a magnitude of an output load.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 a timing chart for illustrating the operation of the switching power source apparatus of FIG. 1;

DETAILED DESCRIPTION OF THE INVENTION

In the following, the preferred embodiments of the present invention will be described with reference to the attached drawings.

First Embodiment

Figure 1:
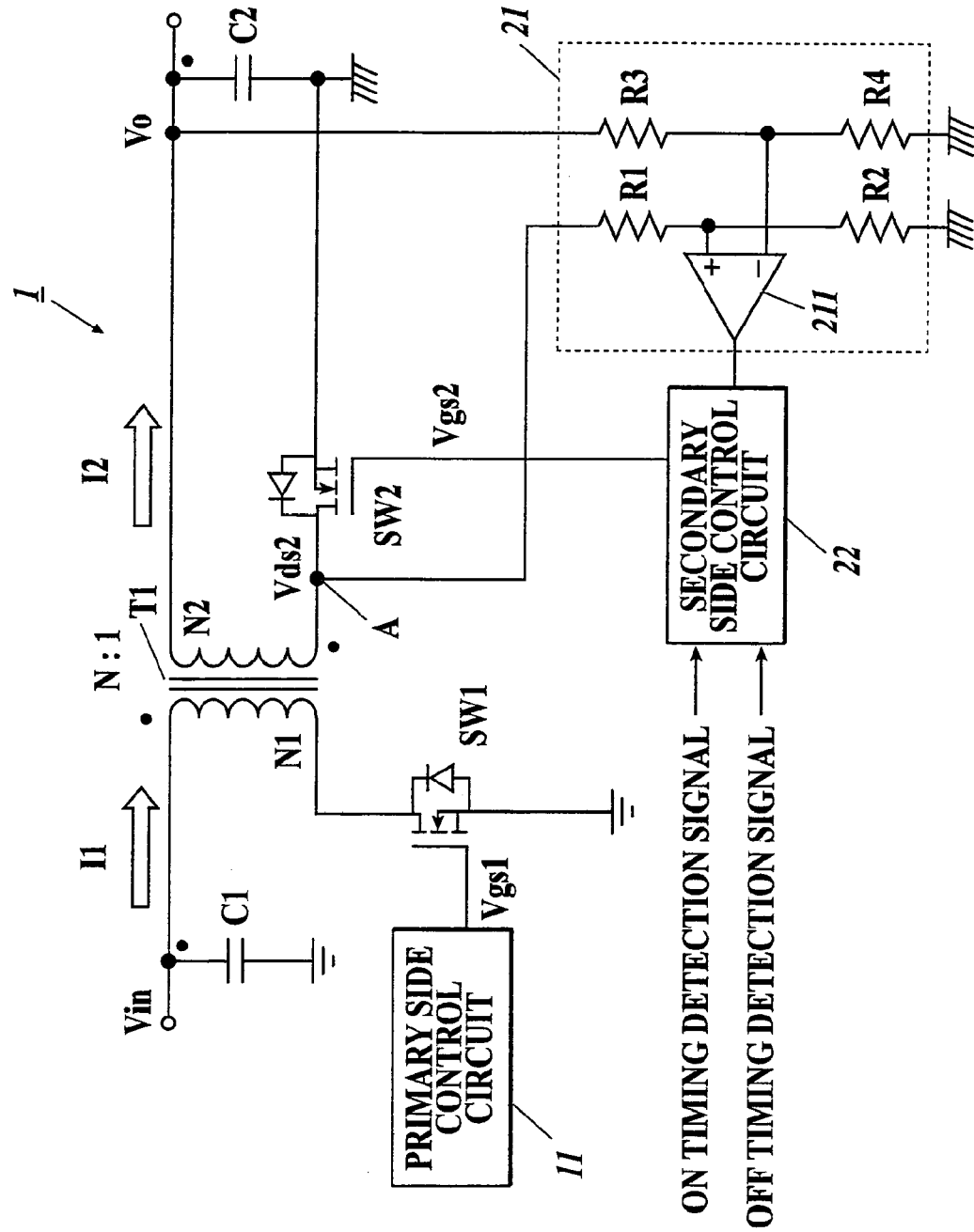
FIG. 1 is a configuration diagram showing a switching power source apparatus of a first embodiment of the present invention.

FIG. 1 is a configuration diagram showing a switching power source apparatus of a first embodiment of the present invention.

The switching power source apparatus 1 of the first embodiment is a flyback system power source apparatus, and includes a transformer T1 equipped with a primary winding N1 and a secondary winding N2 the polarity of which is inverted to that of the primary winding N1, a switching element (for example, N channel power MOS FET) SW1 to intermittently apply an input voltage Vin to the primary winding N1, a primary side control circuit 11 to perform on-off control of the switching element SW1, a smoothing capacitor C1 to smooth the input voltage Vin, a synchronous rectifying element (for example, N channel power MOS FET) SW2 to rectify the current flowing through the secondary winding N2, a smoothing capacitor C2 to smooth the output voltage Vo, a load detection circuit 21 to generate and output a signal indicating the magnitude of an output load by voltage comparison on the secondary side, a control circuit 22 to perform the on-off control of the synchronous rectifying element SW2, and the like.

The winding ratio of the primary winding N1 and the secondary winding N2 of the transformer T1 is N:1, and is set to satisfy the following formula (1) in association with the input voltage Vin and the output voltage Vo.

$$Vin/N > Vo \qquad (1)$$

The primary side control circuit 11 performs the on-off control of the switching element SW1 so as to stabilize the output voltage Vo by detecting the output voltage Vo through, for example, a photo coupler, or by proving an auxiliary winding to the transformer T1 to detect the output voltage Vo on the basis of the voltage of the auxiliary winding, although the illustration of the photo coupler and the auxiliary winding is omitted. The control method on the primary side is not especially limited, but in the present embodiment, a pulse width modulation (PWM) method is adopted. Either of a self-excited control method and an externally excited control method may be adopted.

The synchronous rectifying element SW2 limits a current flowing through the secondary winding N2 into one direction, and, for example, the synchronous rectifying element SW2 is turned off in a period in which the switching element SW1 on the primary side is turned on and energy is accumulated in the core of the transformer T1 to stop the current of the secondary winding N2. Moreover, the synchronous rectifying element SW2 is turned on or flows a current in a rectifying direction through a body diode in a period in which the switching element SW1 on the primary side is turned off. By being turned on during rectification, the power loss of the rectifying element SW2 can be decreased so that the efficiency of the voltage conversion by the switching power source apparatus 1 can be increased. In the present embodiment, the synchronous rectifying element SW2 is provided on the current pathway between the secondary winding N2 and the ground terminal.

The load detection circuit 21 includes a first voltage dividing circuit (R1, R2) to receive a voltage Vds2 at an intermediate node A between the synchronous rectifying element SW2 and the transformer T1 to perform the voltage division of the voltage Vds2 at a predetermined ratio, a second voltage dividing circuit (R3, R4) to receive the output voltage Vo to perform the voltage division thereof at a predetermined ratio, and an analog comparator 211 to compare the magnitudes of the outputs of the first voltage dividing circuit and the second voltage dividing circuit with each other.

Each of the resistance values of the first voltage dividing circuit (R1, R2) and the second voltage dividing circuit (R3, R4) is set so that each of the voltage dividing ratios becomes "(2+α):1" (α indicates an margin value within a range of from 0 to 0.5 or the like). That is, by such first and second voltage dividing circuits, a voltage of the voltage Vds2 at the intermediate node A multiplied by a coefficient g1 is applied to the non-inverting input terminal of the comparator 211, and a voltage of the output voltage Vo multiplied by a coefficient (2+α)×g1 is applied to the inverting input terminal of the comparator 211. Consequently, the voltage Vds2 at the intermediate node A and the output voltage (2+α)×Vo are compared with each other in the comparator 211.

In the present embodiment, only the synchronous rectifying element SW2 is connected on the current pathway between the terminal on the positive polarity side of the secondary winding N2 and the ground, and no element is connected on the current pathway between the terminal on the negative polarity side of the secondary winding N2 and the output terminal. Consequently, the voltage at the intermediate node A becomes the same value as that of the source-to-drain voltage Vds2 of the synchronous rectifying element SW2, and the output voltage Vo input into the second voltage dividing circuit (R3, R4) becomes the same value as that of the terminal voltage on the negative polarity side of the secondary winding N2.

Incidentally, if, for example, a current detecting resistance or the other detecting elements is connected between one terminal of the secondary winding N2 and the output terminal, then the voltage to be led to the load detection circuit 21 is slightly changed by the element, but the voltage at any node may be adopted as the voltage to be led to the load detection circuit 21 as long as the node is the one between the one terminal of the secondary winding N2 and the output terminal.

Moreover, if, for example, a current detecting resistance or the other detecting elements is similarly connected to the other terminal of the secondary winding N2 and the ground in addition to the synchronous rectifying element SW2, then the voltage to be led to the load detection circuit 21 is slightly changed by the element, but the voltage at any node may be adopted as the voltage to be led to the load detection circuit 21 as long as the node is the one between the other terminal of the secondary winding N2 and the synchronous rectifying element SW2.

The comparator 211 outputs a high level signal when the output of the first voltage dividing circuit (R1, R2) is higher than the output of the second voltage dividing circuit (R3, R4), and the comparator 211 outputs a low level signal when the state is reverse to the aforesaid one. The details of the operation of the comparator 211 will be described later, but the high level signal of the comparator 211 is output in an on-period of the switching element SW1 on the primary side. Since the switching power source apparatus 1 of the present embodiment is configured to perform the control of the primary side by the PWM control, it is possible to judge the magnitude of the output load on the basis of the pulse width of the high level signal of the comparator 211. That is, if the pulse width is wide, then the output load is large. If the pulse width is narrow, then the output load is small.

The secondary side control circuit 22 receives an on timing detection signal and an off timing detection signal from a circuit for detecting on timing of the synchronous rectifying element SW2 and a circuit for detecting off timing thereof, respectively, though the circuits are omitted to be shown, to perform the on-off control of the synchronous rectifying element SW2 on the basis of the detection signals. Although the detection method of the on timing and the off timing is not especially limited, for example, the method can be configured as follows: depending on the source-to-drain voltage Vds2 of the synchronous rectifying element SW2, the state in which the switching element SW1 on the primary side is turned off and the drain voltage Vds2 falls is detected as the on timing, and the state in which the secondary side current I2 becomes close to zero is detected as the off timing. In addition, the current polarity on the secondary side may be detected by means of a current detecting resistance or a current detection circuit element, and the on timing and the off timing may be detected on the basis of the detection results.

Moreover, in the secondary side control circuit 22, the minimum on-time To1 is also set, by which if the synchronous rectifying element SW2 is once turned on, the synchronous rectifying element SW2 is forcibly kept to be on until a previously set time elapses lest the erroneous control of the synchronous rectifying element SW2 should be performed by ringing arising in the secondary winding N2 caused by the turning-on and turning-off of the switching element SW1 on the primary side.

Furthermore, the secondary side control circuit 22 monitors the output from the load detection circuit 21 to judge whether the output load is larger than a predetermined value or not. The secondary side control circuit 22 performs the control of turning on the synchronous rectifying element SW2 only in the case where the detected output indicating that the output load is larger than the predetermined value exists. On the other hand, in the case where the detected output indicating that the output load is smaller than the predetermined value exists, the control of turning on the synchronous rectifying element SW2 is not performed, and the control of maintaining the off state of the synchronous rectifying element SW2 all the time is performed.

Next, the operation of the switching power source apparatus 1 configured as above will be described.

FIG. 2 shows a timing chart for illustrating the operation of the switching power source apparatus 1 of FIG. 1.

The primary side control circuit 11 performs the on-off drive of the switching element SW1 by changing a control voltage Vgs1 of the switching element SW1 between a high level output and a low level output in accordance with the pulse width modulation in order to stabilize the output voltage Vo (see FIG. 2 (Vgs1)). Moreover, the secondary side control circuit 22 receives an off timing detection signal, and, when the secondary side current I2 approaches to zero, the secondary side control circuit 22 changes a control voltage Vgs2 to the low level to control the synchronous rectifying element SW2 to be turned off.

Consequently, in an on-period of the switching element SW1 on the primary side in FIG. 2, the synchronous rectifying element SW2 is turned off, and, as shown in FIG. 2 (Vds2), the voltage Vds2 at the intermediate node A becomes a high voltage generated by the addition of the output voltage Vo and the voltage "Vin/N" of the secondary winding N2.

Moreover, when the switching element SW1 on the primary side is turned off, the voltage of the secondary winding N2 of the transformer T1 is inverted and a current flows through a body diode (parasitic diode) of the synchronous rectifying element SW2. Alternatively, an on timing detection signal is transmitted to the secondary side control circuit 22 by the detection of the current, and thereby the control voltage Vgs2 is changed to the high level to turn on the synchronous rectifying element SW2. By such an operation, as shown in FIG. 2 (Vds2), the voltage Vds2 at the intermediate node A to be led to the load detection circuit 21 is clamped to almost zero voltage in the period in which the secondary side current I2 is flowing.

On the other hand, in the case of a current discontinuous mode, a period T1 in which both of the switching element SW1 on the primary side and the synchronous rectifying element SW2 on the secondary side are turned off and both of the currents I1 and I2 become zero arises. Moreover, in the period T1, a resonance is caused by the inductance of the primary winding N1 of the transformer T1 and the parasitic capacity of the switching element SW1 on the primary side. Then, the resonance voltage is transmitted to the secondary winding N2, and a resonance voltage Vr is generated on the drain voltage Vds2 of the synchronous rectifying element SW2 as shown in FIG. 2 (Vds2). On the secondary side, since the drain voltage Vds2 does not become greatly lower than zero voltage by the synchronous rectifying element SW2, the resonance voltage Vr becomes the voltage having the center voltage of the output voltage Vo and the amplitude of about "2×Vo."

Since the winding ratio of the transformer T1 meets the relation of the formula (1) mentioned above, as shown in FIG. 2 (Vds2), the drain voltage Vds2 (="Vo+Vin/N") in a period in which the switching element SW1 on the primary side is turned on is larger than the maximum voltage (="2Vo") of the drain voltage Vds2 in a resonance period.

Accordingly, by the comparison of the drain voltage Vds2 and the output voltage Vo with the weighting of "1:(2+α)" in the load detection circuit 21, a detected output that changes to a high level only in the period during which the switching element SW1 is turned on (only in the period in which the drain voltage Vds2 is a high voltage) can be obtained as shown in the FIG. 2 (Detected Output of Load Detection Circuit 21).

Moreover, in the case of a current continuous mode in which a current necessarily flows through either the primary winding N1 or the secondary winding N2 in the transformer T1, the drain voltage Vds2 is clamped in the neighborhood of the ground potential or rises to the voltage ("Vo+Vin/N"). Consequently, by the voltage comparison similar to that mentioned above in the load detection circuit 21, a detected output changing to the high level only in a period (period in which the drain voltage Vds2 takes the high voltage) in which the switching element SW1 is turned on can be obtained.

Consequently, it becomes possible to measure the pulse width of an on-signal of the switching element SW1 on the primary side by the detected output of the load detection circuit 21, and thereby it becomes possible to judge the magnitude of an output load in the secondary side control circuit 22.

The secondary side control circuit 22 generates a reference pulse having a constant pulse width for light load judging in synchronization with the timing of the changes of the detected output of the load detection circuit 21 to the high level, for example, as shown in FIG. 2 (Light Load Determination Reference Pulse Width). Then, the pulse widths of both of the reference pulse and the detected output of the load detection circuit 21 are compared by the detection of which of the reference pulse and the detected output changes to the low level earlier. As a result, as shown as a detection pulse Po1 of FIG. 2 (Detected Output of Load Detection Circuit 21), if the pulse width of the detection pulse Po1 is wider than that of the reference pulse, then the secondary side control circuit 22 judges that the load is larger than the predetermined value, and performs the control of turning on the synchronous rectifying element SW2 by changing the control signal Vgs2 of the synchronous rectifying element SW2 to the high level when the next on timing detection signal is input thereto.

If the secondary side control circuit 22 performed the on-control, then the secondary side control circuit 22 further sets the minimum on-time To1 of the degree of a period in which ringing subsides (see FIG. 2 (Vgs2)), and performs the control of forcibly maintaining the synchronous rectifying element SW2 in the state of being turned on even if the input of an off timing detection signal is performed in this period in order to avoid erroneous control owing to the ringing.

On the other hand, if the pulse width of a detection pulse Po2 is narrower than that of the reference pulse as shown as the detection pulse Po2 in FIG. 2 (Detected Output of Load Detection Circuit 21), then the secondary side control circuit 22 judges that the load is smaller than the predetermined value, and leaves the control signal Vgs2 in the state of being the low level even if the succeeding on timing detection signal is input not to perform the control of turning on the synchronous rectifying element SW2.

If the secondary side control circuit 22 turns on the synchronous rectifying element SW2 when the load is small, then the minimum on-time To1 becomes longer than the period of from the turning-on of the synchronous rectifying element SW2 to a change of the secondary side current I2 to zero as shown as a pulse signal of a dotted line in FIG. 2 (Vgs2), and a reverse flow is generated in the secondary side current I2 in a period of the end of the minimum on-time To1.

However, since the on-control of the synchronous rectifying element SW2 is stopped in the case where the pulse width of the detection pulse Po2 is narrower than that of the reference pulse in the secondary side control circuit 22, the secondary side current I2 flows by passing through the body diode of the synchronous rectifying element SW2, and the current I2 stops when the secondary side current I2 falls to zero by the rectifying operation of the body diode not to generate any reverse currents. Moreover, when the output load is small, the secondary side current I2 does not become a large current. Consequently, even if the secondary side current I2 flows through the body diode, the loss does not become so large. Furthermore, the drive loss for driving the gate terminal of the synchronous rectifying element SW2 made of a power MOS FET can be reduced.

As described above, according to the load detection circuit 21 provided in the switching power source apparatus 1 of the present embodiment, the on-period of the switching element SW1 on the primary side is detected by the comparison of the voltages at the two nodes of the secondary side circuit (the output voltage Vo and the drain voltage Vds2 of the synchronous rectifying element SW2), and thereby a detected output indicating the magnitude of an output load is generated. By the configuration of the load detection circuit 21 like this, it is possible to surely detect the magnitude of the output load with low loss.

Moreover, according to the switching power source apparatus 1 of the present embodiment, the on-off control of the synchronous rectifying element SW2 is performed only when the output load is large on the basis of the detected output of the load detection circuit 21, and the on-off control of the synchronous rectifying element SW2 is stopped when the output load is small. Consequently, for example, it can be avoided that the secondary side current I2 flows reversely at the time of a low load by setting the minimum on-time To1. Moreover, the drive loss of the synchronous rectifying element SW2 at the time of a low load is reduced, and the difference of losses between the case where the synchronous rectifying element SW2 is turned on and the case where a current flows through a body diode does not become large at the time of a low load. Consequently, the optimization of the synchronous rectifying control at the time of a low load can be totally performed, and the advantage of enabling the improvement of power efficiency can be obtained.

Second Embodiment

Figure 3:
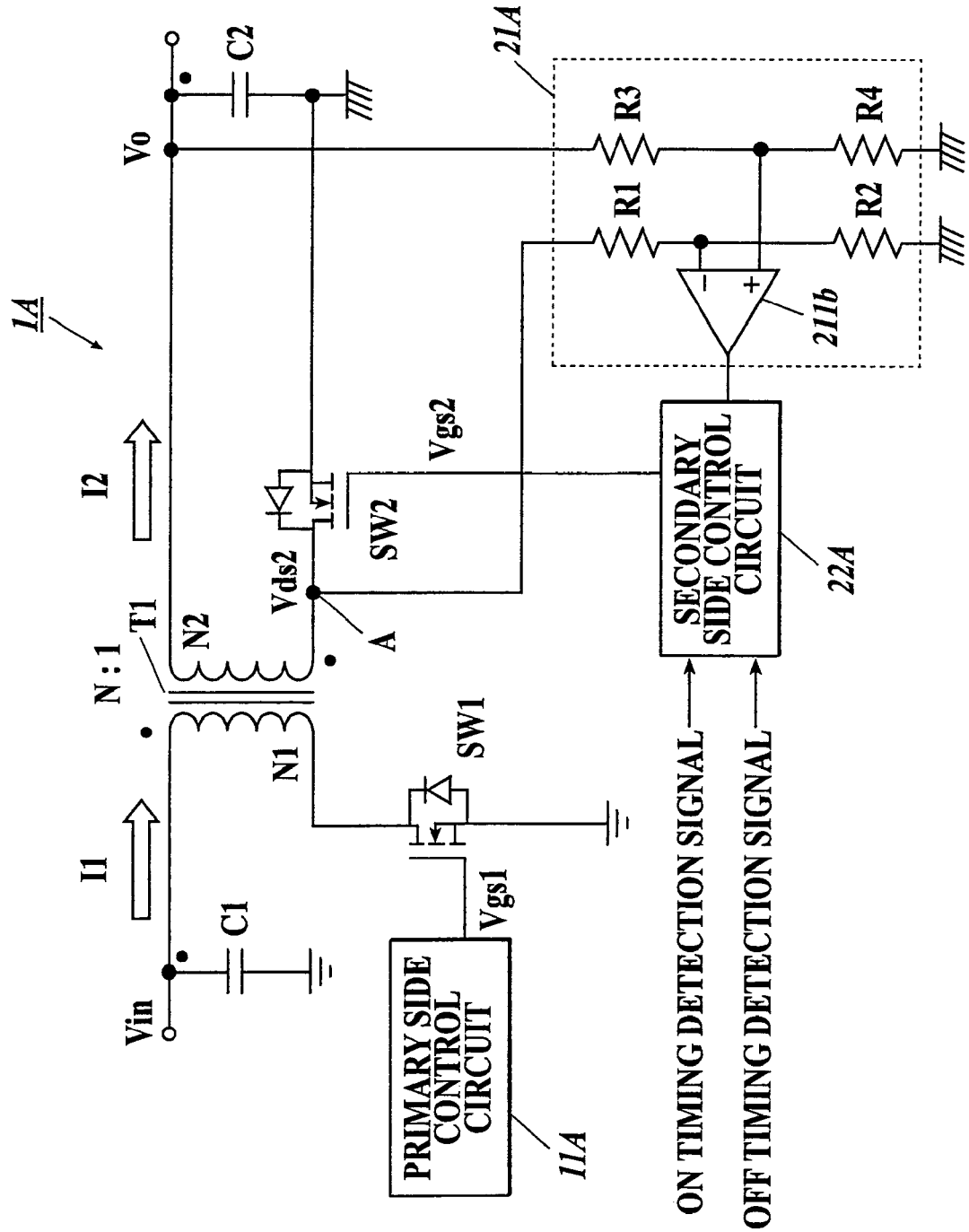
FIG. 3 is a configuration diagram showing a switching power source apparatus of a second embodiment of the present invention.
Figure 4:
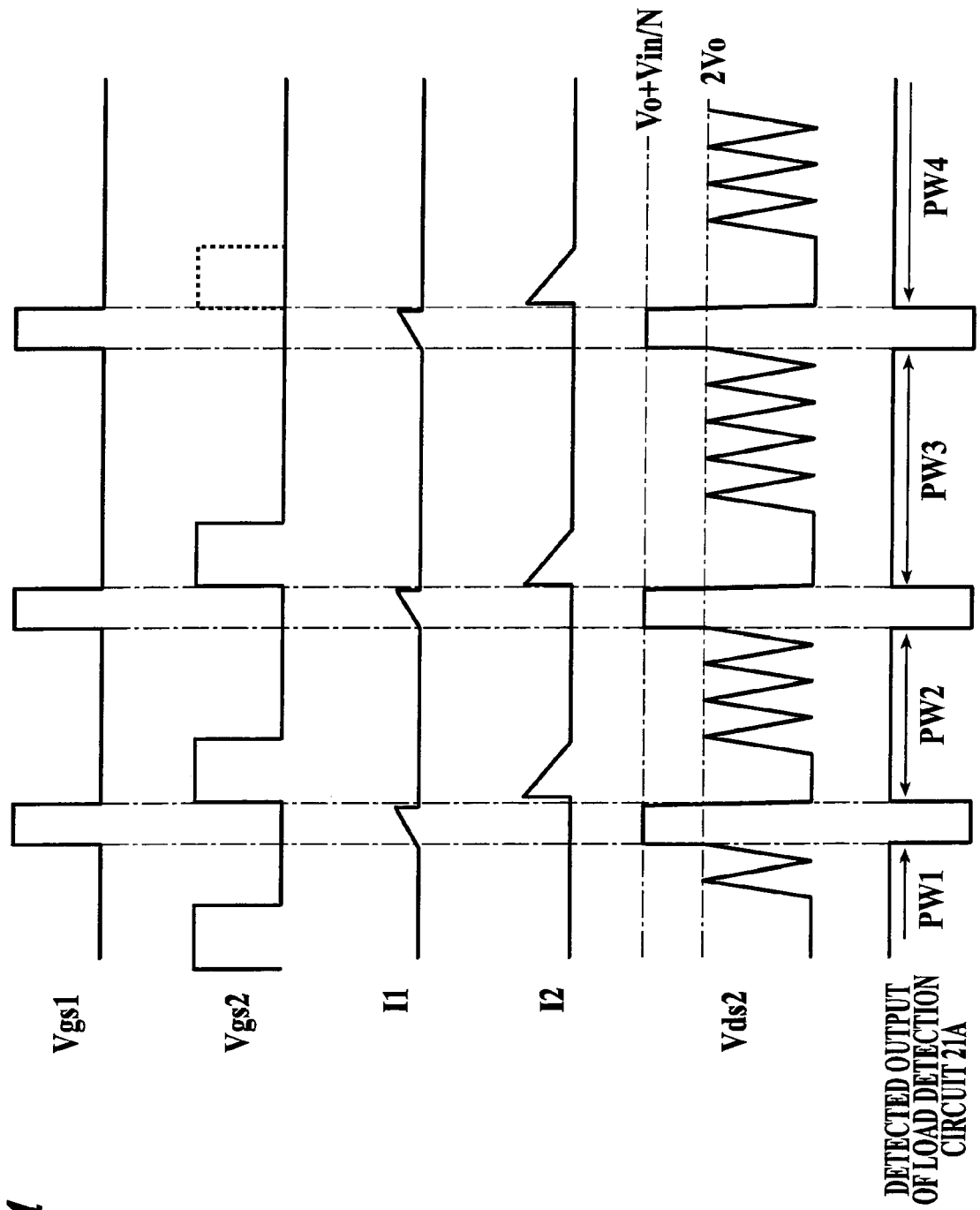
FIG. 4 is a timing chart for illustrating the operation of the switching power source apparatus of FIG. 3.
Figure 5:
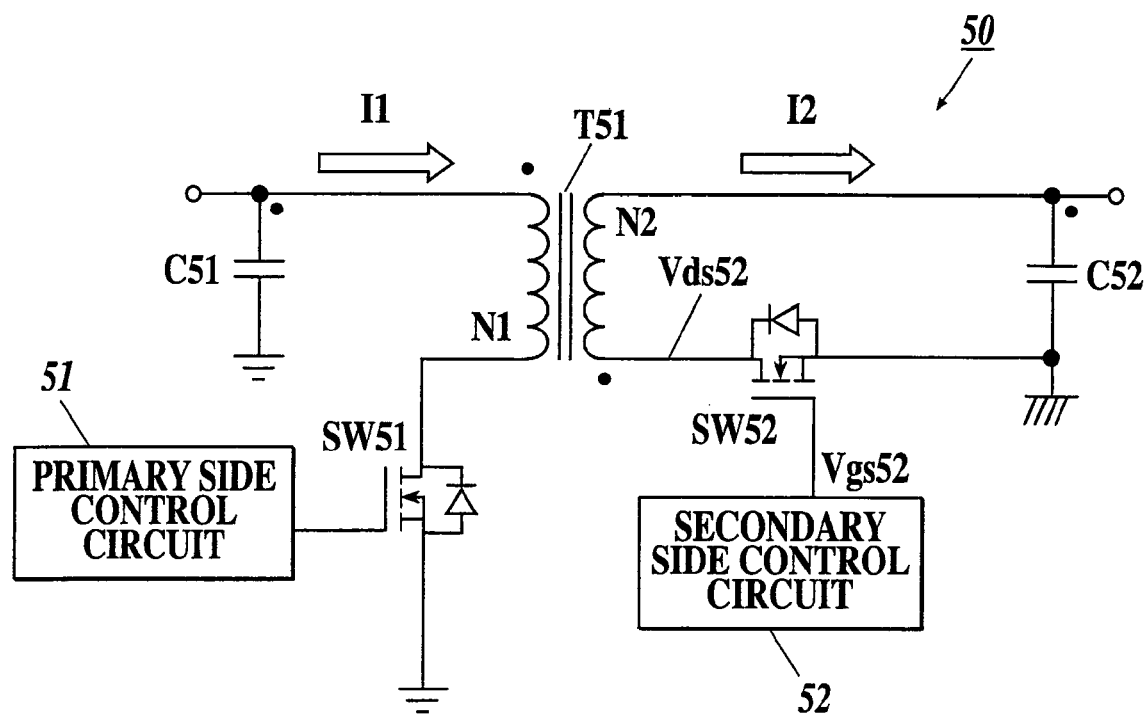
FIG. 5 is a configuration diagram showing a general conventional flyback system switching power source apparatus.
Figure 6:
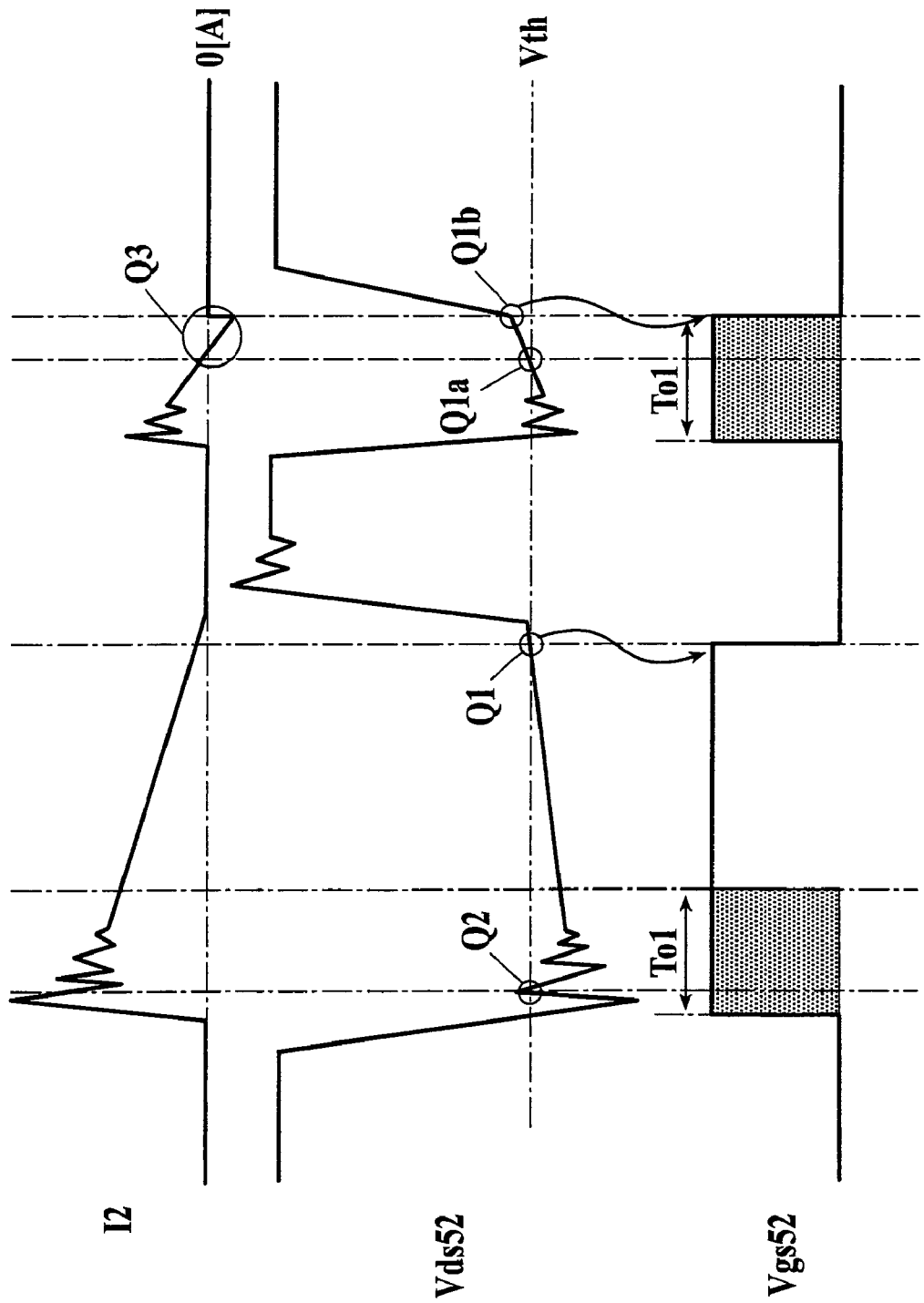
FIG. 6 is a timing chart for illustrating an example of the operation of the flyback system switching power source apparatus.

FIG. 3 is a configuration diagram showing a switching power source apparatus 1A of the second embodiment of the present invention. FIG. 4 is a timing chart for illustrating the operation of the switching power source apparatus 1A.

The switching power source apparatus 1A of the second embodiment adopts a pulse frequency modulation (PFM) system as the control method of the primary side control circuit 11A.

Moreover, the second embodiment adopts the configuration of inverting the polarities of two input terminals of a comparator 211b of a load detection circuit 21A to those of the comparator 211 of the first embodiment. The other configurations of the second embodiment are the same as those of the first embodiment, and the descriptions of the other configurations will be omitted.

As shown in FIG. 4 (Vgs1), in the switching power source apparatus 1A of the second embodiment, the switching element SW1 on the primary side is turned on by on-signals (the high level signals of the control voltage Vgs1), each having almost the same width, by the PFM control, and the frequency of the on-signals is modulated according to output loads. That is, when an output load is large, the high level signals of the control voltage Vgs1 are output at a short period, and when an output load is small, the high level signal of the control voltage Vgs1 are output at a long period.

The load detection circuit 21A of the second embodiment compares the voltage of the output voltage Vo multiplied by "(2+α)" with the drain voltage Vds2 of the synchronous rectifying element SW2 with the comparator 211b similarly to the first embodiment. The polarity of an output signal is inverted from that of the first embodiment as shown in FIG. 4 (Detected Output of Load Detection Circuit 21). That is, when the drain voltage Vds2 is higher than the aforesaid voltage, a signal of the low level is output, and when the drain voltage Vds2 is lower than the aforesaid voltage, a high level signal is output.

Consequently, a detected output indicating the time interval of outputting the on-signal of the switching element SW1 (the high level signal of the control signal Vgs1) by pulse widths PW1-PW4 is obtained from the load detection circuit 21A. That is, since the period of the on-signal of the switching element SW1 becomes shorter at the time of a high load, the pulse widths PW1 and PW2 of the high level outputs of the load detection circuit 21A become shorter. Since the period of the on-signal becomes longer at the time of a low load, the pulse widths PW3 and PW4 of the high level outputs of the load detection circuit 21A becomes longer.

The secondary side control circuit 22A compares the pulse widths PW1-PW4 of the high level outputs of the load detection circuit 21A with that of the reference pulse similarly to the first embodiment. When the pulse widths PW1-PW4 are shorter than the pulse width of the reference pulse, the secondary side control circuit 22A judges that the load is larger than the predetermined value, and performs the on-off control of the synchronous rectifying element SW2. On the other hand, the pulse widths PW1-PW4 of the high level outputs of the load detection circuit 21A are longer than the pulse width of the reference pulse, the secondary side control circuit 22A judges that the load is smaller than the predetermined value, and stops the on-off control of the synchronous rectifying element SW2.

As described above, also in the switching power source apparatus 1A of the PFM control, the magnitude of a load can be surely detected with low loss by the load detection circuit 21A, and thereby the optimum control of the synchronous rectifying element SW2 according to a load can be performed.

Incidentally, the present invention is not limited to the first and second embodiments, but various changes can be performed. For example, although the example of using the load detection circuits 21 and 21A in order to stop the on-off control of the synchronous rectifying element SW2 at the time of a low load has been shown in the embodiments, for example, the detected output of the load detection circuits 21 and 21A can be used for various kinds of control on the secondary side, such as switching the detection method of the operation timing of the synchronous rectifying element SW2 on the basis of the judgment of whether the operation mode of the switching power source apparatus 1 is the current continuous mode (high load) or the current discontinuous mode (low load) by the input of the detected output of the load detection circuits 21 and 21A.

Moreover, though the first and second embodiments is configured so as to compare the output voltage Vo and the drain voltage Vds2 in the load detection circuit 21 and 21A by performing the voltage division of the predetermined ratios with the first voltage dividing circuit (R1, R2) and the second voltage dividing circuit (R3, R4), as long as the weighting of the ratio of 1:(2+α) can be added to both the voltages to be compared, the voltage division may be performed only to one voltage, or one voltage or both of the voltages may be compared after being boosted.

In addition, the detailed configurations and methods shown in the embodiments can be suitably changed without departing from the sprit and scope of the present invention, for example, the switching element and the synchronous rectifying element can be changed to various power transistors.

According to the present embodiment, a switching power source apparatus includes: a transformer including a primary winding and a secondary winding; a switching element to intermittently apply a voltage to the primary winding by an on-off operation; and a synchronous rectifying element to rectify a current in the secondary winding, wherein the switching power source apparatus is a flyback system switching power source apparatus to receive input of electric power from a primary winding side to perform voltage output to a secondary wiring side, and the switching power source apparatus further comprises a load detection circuit to compare an output voltage to be output onto the secondary winding side with a voltage at a node between the synchronous rectifying element and the transformer by adding predetermined weighting to the voltages to be compared so as to generate a signal indicating a magnitude of an output load.

Preferably, in the switching power source apparatus, the synchronous rectifying element is a MOS FET, and the voltage at the node between the synchronous rectifying element and the transformer is a drain-to-source voltage of the MOS FET or a voltage between a drain terminal of the MOS FET and the ground.

Preferably, the switching power source apparatus further includes a secondary side control circuit to perform on-off control of the synchronous rectifying element when the secondary side control circuit judges that the output load is large on the basis of a detected output of the load detection circuit, and stops the on-off control of the synchronous rectifying element when the secondary side control circuit judges that the output load is small.

Preferably, in the switching power source apparatus, the synchronous rectifying element is a power transistor including a body diode, and the switching power source apparatus is configured so that the current of the secondary winding passes through the body diode of the synchronous rectifying element to be rectified when the on-off control of the synchronous rectifying element is stopped by the secondary side control circuit.

Preferably, in the switching power source apparatus, the load detection circuit includes: a voltage division circuit to respectively perform voltage divisions of the output voltage and the voltage at the node between the synchronous rectifying element and the transformer so that the predetermined weighting may be added to divided voltages, and an analog comparator to compare a magnitude of the output voltage with a magnitude of a terminal voltage of the synchronous rectifying element, the voltages having been subjected to the voltage division by the voltage division circuit, wherein a magnitude of the output load is expressed by a pulse width or an output frequency of a pulse signal output from the analog comparator.

Preferably, in the switching power source apparatus, when a winding ratio of the primary winding and the secondary winding of the transformer is N:1, the output voltage is Vo, and an input voltage is Vin, N, Vo, and Vin are set to satisfy Vo<Vin/N.

According to the present invention, by comparing the output voltage with the voltage on the transformer side of the synchronous rectifying element by adding predetermined weighting, the load detection circuit for generating the signal detecting the magnitude of the output load can surely judge the magnitude of the output load by a simple circuit configuration with less loss.

Moreover, by changing control system based on the detected signal of the load detection circuit, the operation of the synchronous rectifying element can be optimized so that high conversion efficiency can be realized.

The entire disclosure of Japanese Patent Application No. 2008-124219 filed on May 12, 2008, including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A switching power source apparatus comprising:
    a transformer including a primary winding and a secondary winding;
    a switching element to intermittently apply a voltage to the primary winding by an on-off operation; and
    a synchronous rectifying element to rectify a current in the secondary winding, wherein
    the switching power source apparatus is a flyback system switching power source apparatus to receive input of electric power from a primary winding side to perform voltage output to a secondary wiring side, and
    the switching power source apparatus further comprises a load detection circuit to compare an output voltage to be output onto the secondary winding side with a voltage at a node between the synchronous rectifying element and the transformer by adding predetermined weighting to the voltages to be compared so as to generate a signal indicating a magnitude of an output load.

2. The switching power source apparatus according to claim 1, wherein
    the synchronous rectifying element is a MOS FET, and
    the voltage at the node between the synchronous rectifying element and the transformer is a drain-to-source voltage of the MOS FET or a voltage between a drain terminal of the MOS FET and the ground.

3. The switching power source apparatus according to claim 1, further comprising
    a secondary side control circuit to perform on-off control of the synchronous rectifying element when the secondary side control circuit judges that the output load is large on the basis of a detected output of the load detection circuit, and stops the on-off control of the synchronous rectifying element when the secondary side control circuit judges that the output load is small.

4. The switching power source apparatus according to claim 3, wherein
    the synchronous rectifying element is a power transistor including a body diode, and
    the switching power source apparatus is configured so that the current of the secondary winding passes through the body diode of the synchronous rectifying element to be rectified when the on-off control of the synchronous rectifying element is stopped by the secondary side control circuit.

5. The switching power source apparatus according to claim 1, wherein
    the load detection circuit includes:
    a voltage division circuit to respectively perform voltage divisions of the output voltage and the voltage at the node between the synchronous rectifying element and the transformer so that the predetermined weighting may be added to divided voltages, and
    an analog comparator to compare a magnitude of the output voltage with a magnitude of a terminal voltage of the synchronous rectifying element, the voltages having been subjected to the voltage division by the voltage division circuit, wherein
    a magnitude of the output load is expressed by a pulse width or an output frequency of a pulse signal output from the analog comparator.

6. The switching power source apparatus according to claim 1, wherein
    when a winding ratio of the primary winding and the secondary winding of the transformer is N:1, the output voltage is Vo, and an input voltage is Vin, N, Vo, and Vin are set to satisfy Vo<Vin/N.

* * * * *